(12) United States Patent
Wegener et al.

(10) Patent No.: US 8,588,943 B2
(45) Date of Patent: Nov. 19, 2013

(54) METHOD FOR PARAMETERIZING OPERATING MEANS

(75) Inventors: Friedrich Wegener, Vahlbruch (DE); Dietmar Krumsiek, Emmerthal (DE); Johannes Kalhoff, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 316 days.

(21) Appl. No.: 12/451,617

(22) PCT Filed: May 21, 2008

(86) PCT No.: PCT/EP2008/004064
§ 371 (c)(1),
(2), (4) Date: Mar. 24, 2010

(87) PCT Pub. No.: WO2008/145290
PCT Pub. Date: Dec. 4, 2008

(65) Prior Publication Data
US 2010/0179669 A1 Jul. 15, 2010

(30) Foreign Application Priority Data
May 25, 2007 (DE) .......................... 10 2007 024 687

(51) Int. Cl.
*G05B 15/00* (2006.01)
(52) U.S. Cl.
USPC ................................ 700/83; 700/12; 717/100
(58) Field of Classification Search
USPC .................. 700/12, 83, 86, 87; 710/104, 105; 717/121
See application file for complete search history.

(56) References Cited

U.S. PATENT DOCUMENTS

| 5,778,226 | A  | * | 7/1998 | Adams et al. | 719/311 |
| 6,449,715 | B1 | * | 9/2002 | Krivoshein | 713/1 |
| 7,778,717 | B2 | * | 8/2010 | Bachman et al. | 700/83 |
| 7,865,907 | B2 | * | 1/2011 | Opheim | 719/321 |
| 8,015,322 | B2 | * | 9/2011 | Yoshida | 710/19 |

(Continued)

FOREIGN PATENT DOCUMENTS

| DE | 10132036 | 1/2003 |
| DE | 10343670 | 5/2005 |
| WO | WO2006/029994 | 3/2006 |
| WO | WO2006/128395 | 12/2006 |

OTHER PUBLICATIONS

International Search Report and Written Opinion based on corresponding International application No. PCT/EP2008/004064 dated Sep. 29, 2008.

(Continued)

*Primary Examiner* — Dave Robertson
(74) *Attorney, Agent, or Firm* — Ohlandt, Greeley, Ruggiero & Perle, L.L.P.

(57) ABSTRACT

The invention relates to a method for parameterizing operating means connected to a data transmission medium. In this case, for at least several of the connected operating means, in each case, a device description will be stored in a central facility, each device description containing at least one function and the parameter set belonging thereto. In addition, a list of several predefined device functions will be stored in memory, for which the corresponding parameter set will be assigned each time to the operating means that support the device function. If a device function is selected, then in response to the selected device function, at least one operating means that supports this device function will be parameterized.

10 Claims, 1 Drawing Sheet

(56) References Cited

U.S. PATENT DOCUMENTS

| | | | |
|---|---|---|---|
| 8,046,519 B2 * | 10/2011 | Ramsay | 710/315 |
| 8,060,222 B2 * | 11/2011 | Eldridge et al. | 700/83 |
| 8,185,871 B2 * | 5/2012 | Nixon et al. | 717/121 |
| 2010/0222902 A1 * | 9/2010 | Eldridge et al. | 700/87 |

OTHER PUBLICATIONS

English translation of International Preliminary Report dated Dec. 10, 2009 for corresponding International Application No. PCT/EP2008/004064.

* cited by examiner

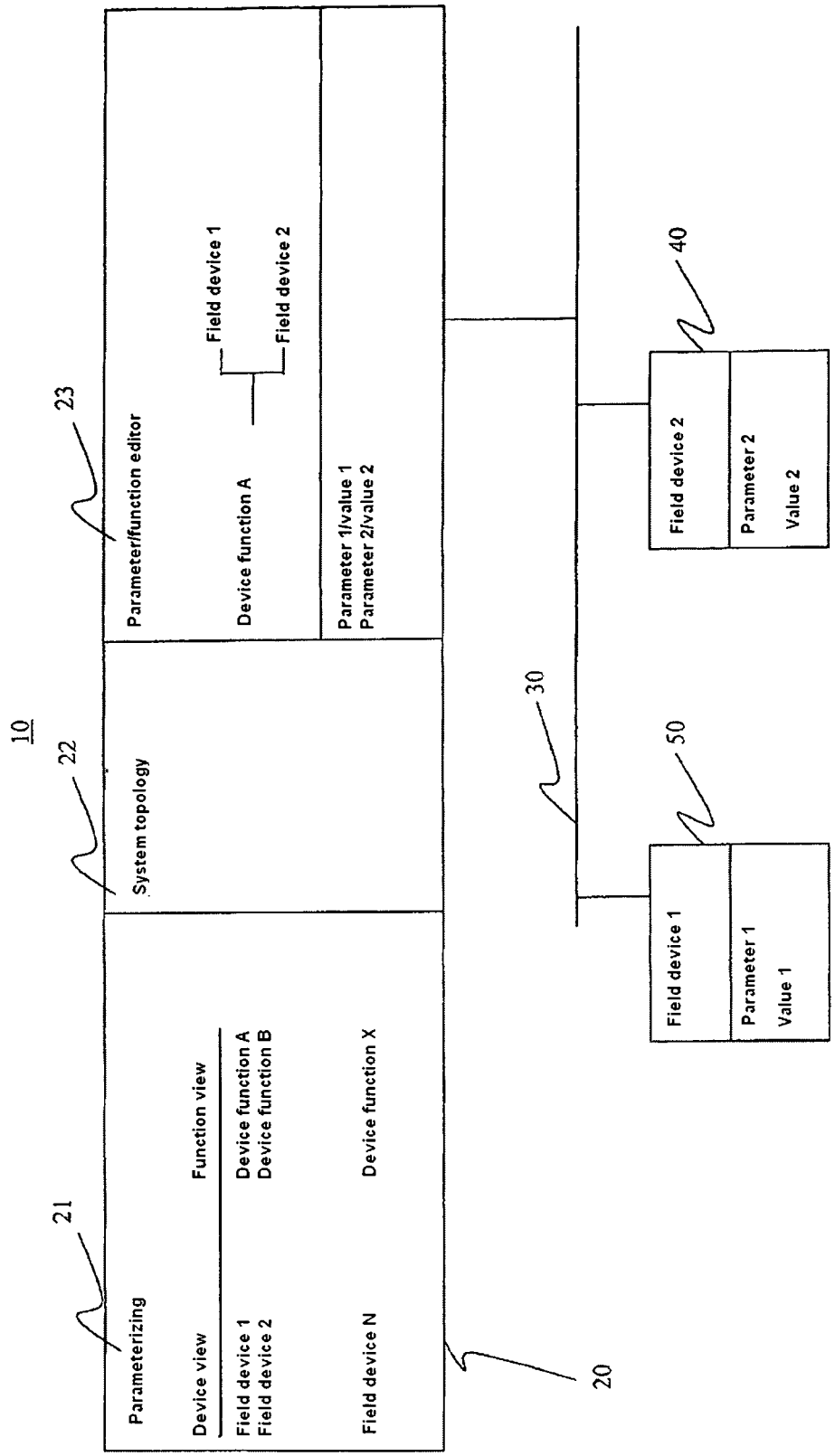

METHOD FOR PARAMETERIZING OPERATING MEANS

CROSS REFERENCE TO RELATED APPLICATIONS

This application is a U.S. National Stage Entry under 35 U.S.C. §371 of International Application No. PCT/EP2008/004064, filed on May 21, 2008, which claims the benefit of German Application No. 10 2007 024 687.2, filed in the German Patent Office on May 25, 2007.

BACKGROUND OF THE INVENTION

1. Field of the Invention

The invention relates to a method for parameterizing operating means connected to a data transmission medium.

2. Description of Related Art

Parameterizing software exists, such as, e.g., the FDT/DTM (Field Device Tool/Device Type Manager) software tool, for starting up and parameterizing operating means, such as, for example, field devices of an automation system. With the help of the FDT/DTM concept, it is possible to parameterize and to operate manufacturer-specific field devices. A software program bundled in an FDT package (a DTM is written by the device manufacturer) can access the field device in a point-to-point relationship via communication DTMs. The system administrator distributes the necessary DTMs and the FDT package to the system, insofar as these have not already been provided by a control station of the system. Users of the system can now use the device parameterizing software.

In another known concept, each manufacturer writes a device description for each device in a defined language, for example XML. This device description defines the device profile, i.e., possible adjustments of the device. The semantics are predefined, for example, by field bus user organizations. The administrator then distributes the device description to the system. Users of the system may now access the device parameterizing software with the help of system software (e.g., programming systems or network configurators).

A serious disadvantage of these concepts is to be seen in the fact that each field device and each system component must be parameterized individually, even when identical field devices and components are present.

A parameterizing apparatus is known from WO 2006/18395 A1 for generating parameterizing signals that are based on operating parameters that are individual to the device for one or more electrical devices of an electrical system as well as a corresponding method for parameterizing electrical devices. In the method described in WO 2006/128395 A1, for a plurality of electrical devices whose operating functions and operating parameters that are individual to the device are included in a memory storage apparatus, a list of suitable units is read out and displayed for the user to select a device, depending on the desired operating function.

BRIEF SUMMARY OF THE INVENTION

The object of the invention is to provide a parameterizing method, with which a user-friendly parameterizing of operating means is possible, even when complex operating means are used. Complex operating means, for example, refers to operating means that can provide several different functions and can be used in different fields of application.

A key concept of the invention is to be seen in the fact that the operating means are not to be parameterized via the parameters of the respective field devices themselves, but rather as a function of predefined device functions. In this way, groups of devices that support the same device functions can also be parameterized. In particular, it is not necessary that the operator of the system need know any parameters of the devices used. The operator must know only the function that the field devices are to execute within the system.

The invention solves this technical problem by a method for parameterizing operating means connected to a data transmission medium. For this purpose, in each case, a device description, which is preferably stored in a central facility, will be stored for at least several of the connected operating means.

The device description comprises at least one function as well as the parameter data set belonging thereto. Other value ranges may optionally be indicated for each set of parameters. Functions of an operating means may be, for example, drilling, milling, scanning, and similar operations. A parameter set can contain one single parameter or several parameters, which establish, for example, the set of movements of an operating means. One parameter by itself, however, may also represent a range of values. If value ranges are to be indicated separately for the parameter sets, then these may define, for example, the depth of drilling or the degree of milling. In addition, a list of several predefined device functions, for each of which the corresponding parameter set will be assigned to the operating means, will preferably be stored in the central facility. If at least one device function is to be selected, then in response to the selected device function, at least one operating means that supports this device function will be parameterized.

It should be noted here that the specified sequence of process steps set forth herein does not establish their time course.

Only one single parameter set that can be used to parameterize a group of operating means of the same type will be assigned for least to one of the stored, predefined device functions. A group of operating means of the same device type will now be selected. The parameter set assigned for the selected device function will then be transmitted to the selected group of operating means, all of which will be parameterized by the same parameter set. Thanks to this method, it is possible to parameterize in parallel functionally equivalent operating means of the same manufacturer simply by calling up the desired device function at the central facility. The known FDT/DTM concept can by used for transmitting parameter sets, for which both the central facility as well as the operating means to be parameterized have a standard interface.

In the described example of embodiment, since the selected group of operating means will all execute the same function and can be parameterized by one and the same parameter set, a uniform parameterizing of the operating means can be produced, which can be initiated merely by selecting the corresponding device function.

Alternatively or as an expansion of the above-described method, different parameter sets, each of which can be used for parameterizing a separate operating means, can be assigned at least to one predefined device function. The parameterizing will in turn be initiated by selecting at least one device function and several operating means which support this device function. The parameter sets assigned to the selected device function are each transmitted to the operating means belonging thereto, each parameter set individually parameterizing one predefined operating means of the selected operating means. Thanks to this method, it is possible to parameterize operating means of different manufacturers that support the same type of function in a single step, merely by selecting the device function to be executed by these operating means at the central facility.

It should be noted here that, in addition to the selected operating means, unselected operating means can also support the selected device function. Of course, in this case, the unselected operating means will not be parameterized. With the help of this method, it is thus possible to select operating means that form a so-called logic group, so that changes or a processing of device functions take effect only within the logic group of operating means.

In order to further facilitate for the operator the parameterizing of a plurality of operating means, the operating means that are to be parameterized with respect to this device function will be automatically determined along with the selection of the device function to be executed. After the device function has been selected, parameter sets can be automatically transmitted to the corresponding operating means under control of the central facility.

An appropriate field of application for the operating means may involve field devices, such as, e.g., sensors and actors, control devices and the like. The data transmission medium may be a field bus, for example, the Profibus or the Interbus. A wireless connection may also be used as a transmission medium. A standardized parallel bus or the Ethernet may also be used as the transmission medium. In a preferred embodiment, the respective device descriptions will be stored in a central facility. Various steps will then be conducted in the central facility and other steps will be initiated by the central facility. In this way, a central monitoring and adaptation of the system is possible.

Alternatively, each device description will be stored in the respective operating means or a separate apparatus, for example, a PC. For a first-time determination of a device function or change of an existing device function, the device description of the operating means that supports this device function will be made available to a central facility.

It is also conceivable that not only the device description will be stored in at least one corresponding operating means or a separate apparatus, but that the first-time determination of a device function will be carried out in the at least one operating means or the separate apparatus, the corresponding parameter set of the respective operating means being assigned to the device function, and the specific device function being made available to a central facility together with the parameter set. In order to be able to further automate the parameterizing, steps will be initiated automatically by the central facility, if at least one device function has been selected.

In addition, it is conceivable that the central facility can also be implemented in an operating means connected to it.

BRIEF DESCRIPTION OF THE DRAWINGS

The invention will be explained in more detail below on the basis of an example of embodiment in combination with the single FIGURE.

DETAILED DESCRIPTION OF THE INVENTION

The FIGURE shows, for example, an automation system 10, which uses a field bus 30, to which, merely for simplifying the drawing, only two field devices 40 and 50 as well as a central facility 20 are connected. The central facility 20 may involve a programmable control station. So that field devices 40 and 50 can be parameterized via the central facility 20, a uniform transfer protocol that is based on the FDT/DTM concept, for example, will be used. It is assured thereby that the central facility 20 and the field devices 40 and 50 make available a standardized interface.

An operating interface can be produced on a monitor assigned to the central facility 20, as it is shown in the FIGURE. The operating interface can be divided into three regions, which include the parameterizing region 21, a system topology region 22 and a parameter/function editor region 23. An image of the automation system 10 is shown in the system topology region 22.

In addition, the device descriptions of the field devices 40 and 50 are stored in the central facility 20. For example, the device description of the field device 50 defines two functions and the parameters and value ranges belonging thereto. The field device 40 is also described, for example, by two functions and the parameters and value ranges belonging thereto. Among other things, the field devices 50 and 60 are listed (denoted device 1 and device 2) under the heading "Device view" in the parameterizing region 21, while several predefined device functions, which are characterized as A, B to X, are listed under the heading "Function view". With the help of the parameter/function editor shown in field 23, the operator can select the device function or device functions, which the field devices 40 and 50 connected to field bus 30 will execute.

Let us assume that the two functions of the field device 50, which are stored in the central facility 20, correspond to the defined device function A or to the device function B. The two functions of the field device 40, which are also stored in the central facility 20, correspond, for example, to the predefined device function A or the predefined device function X. In addition, let us assume that the field devices 40 and 50 originate from different manufacturers and thus cannot be parameterized via a common parameter set.

According to the automation system shown in the system topology region 22, the two field devices 40 and 50 are operated as drills. This function corresponds to the device function A. In order to be able to parameterize the field devices 40 and 50 according to the desired device function, the operator first selects the device function A from the parameterizing region 21, which is shown in the parameter/function editor region 23. According to an advantageous embodiment, the central facility 20 is in a position to automatically filter out all the field devices that support functions which correspond to the device function A. In the present example, the central facility 20 detects that the field devices 40 and 50 support functions that correspond to the device function A. In the present example, these two field devices are automatically assigned to the device function A in the parameter/function editor region 23. The central facility 20 is further in a position to assign the respective parameter set and value region belonging thereto, which belongs to the device function A, to both the selected field device 40 and the field device 50. The corresponding data "parameter 1/value 1" and "parameter 2/value 2" will now be assigned to the field device 40 or 50 and shown, for example, in the parameter/function editor region 23. The central facility 20 now will provide for transmitting parameter 1 and value 1 to field device 50 via the field bus 30, while parameter 2 and value 2 will be transmitted to field device 40 via the field bus. The field devices 40 and 50 are parameterized with the help of the received parameters and values and are thus set up for the desired device function A.

Thanks to the described method and the described automation system 10, it is possible that an operator can trigger the parameterizing of the field devices that support the device function A just by the selection of a desired device function, here the device function A. Alternatively, in addition to the device function, the operator can also manually select the field devices that will execute the selected device function in the parameterizing region 21.

One possible implementation of the described method provides that the central facility 20 uses the device function A as the address under which is filed the field devices and the parameter sets and values belonging thereto, which support this function. Thus, when a field device is selected, the central facility 20 is in a position to display the functions that the device can execute. In addition to this, the central facility 20 is in a position to display for a selected device function all the field devices that support this function.

For the case when the field devices 40 and 50 are from the same manufacturer and support the same functions, it suffices to assign only a single parameter set, for example, to device function A, which corresponds to the corresponding functions of the field devices. In this case, the central facility 20 assigns the two field devices 40 and 50 to the selected device function A as well as its common parameter set and value range. Subsequently, the common parameter set and the common value range will be transmitted to both field device 40 and to field device 50.

With the automation system shown in the FIGURE, it is also possible in a simple way to connect new field devices with new functions to the field bus 30. In turn, the device description of the new field devices will be stored in the central facility 20. In the first-time parameterizing of a new field device, which possesses a new function, first a new device function C will be defined, which will be assigned to the parameter set that has been allocated to the corresponding function of the new field device. This assignment will be stored in the central facility 20. After calling up the new device function C at the central facility 20, the new field device will be parameterized in the way described previously.

If another field device, which supports the device function C, is to be connected to the field bus 30 at a later point in time, then this field device can be parameterized in a simple way by the operator first calling up device function C in the parameterizing field 21. The newly connected field device can be manually selected and/or can be automatically selected for parameterizing by the central facility 20, depending on the design of the central facility 20 in each case. Subsequently, the parameter set and, if present, the value range, belonging to the device function C will be transmitted to the newly connected field device.

With the described method, since any field device that has been parameterized and is connected to the field device, its parameter set and the device function assigned to this field device will be stored in memory, newly connected field devices that support the same device functions can be parameterized without the operator needing to know the parameter set belonging to the field device.

It is also possible with the method to use functions which are contained in the device description, for example, as a function description. With an appropriate standardizing, the user would thus be in a position to simply use a plurality of devices by means of one function description.

The invention claimed is:

1. A method for parameterizing operating means connected to a data transmission medium, comprising:
storing in memory a respective device description for at least several of the connected operating means, each device description containing at least one function and a parameter set belonging thereto;
storing in memory a list of several predefined device functions, wherein to each of said predefined device functions the respective parameter sets are assigned which correspond to the operating means that support the respective device function;
selecting at least one device function from said list of several predefined device functions, thereby selecting several operating means that support the selected device function; and
transmitting, in response to the selected device function, to each of the selected operating means the individual parameter set of the parameter sets assigned to the selected device function which corresponds to the respective selected operating means and parameterizing each of the selected operating means with the respective individual parameter set, wherein several different parameter sets are assigned to the selected device function where are respectively used for parameterizing different operating means.

2. The method according to claim 1, wherein the storing in memory step further comprises assigning a single parameter set to at least one predefined device function, whereby the parameter set can be used for the parameterizing of a group of operating means;
wherein the selecting at least one device function step further comprises selecting a group of operating means of the same type of device; and
wherein the parameterizing the at least one operating means step further comprises transmitting the parameter set assigned to the selected device function to the selected operating means and parameterizing of these operating means.

3. The method according to claim 1, wherein the operating means that are to be parameterized will be determined automatically with the selection of the device function.

4. The method according to claim 1, further comprising assigning a value range to each parameter set.

5. The method according to claim 1, wherein the operating means are field devices and the transmission medium is a field bus.

6. The method according to claim 1, wherein the storing in memory step comprises storing the respective device descriptions in memory in a central facility, the selecting at least one device function step is conducted in the central facility, and the parameterizing step is initiated by the central facility.

7. The method according to claim 6 wherein the parameterizing step is initiated automatically by the central facility, if at least one device function has been selected.

8. The method according to claim 1, wherein the storing in memory step comprises storing the device description in memory in the respective operating means or a separate apparatus, that for a first-time determination of a device function or change of a predefined device function, the device description of the operating means that supports this device function will be provided to a central facility.

9. The method according to claim 1, wherein the device description will be stored in memory in at least one corresponding operating means or a separate apparatus, that the first-time determination of a device function is carried out in the at least one operating means or the separate apparatus, the corresponding parameter set of the respective operating means being assigned to the device function, and that the specific device function is provided to a central facility.

10. A method for parameterizing two or more field devices within an automated system, comprising:
connecting the two or more field devices to an operating interface via a data transmission medium;

dividing the operating interface into a parameterizing region, a system topology region, and a parameter/function editor region;

storing device descriptions of the at least two field devices, each device description containing a list of different predefined device functions, wherein each of said predefined device functions includes respective parameter sets that support the different predefined device functions;

selecting, via the parameter/function editor region of the operating interface, a desired device function from the list;

parameterizing, in response to the selected device function, using the parameter sets at least one of the two or more field devices that supports the desired device function; and transmitting, via the data transmission medium, the parameter set assigned to the selected device function to the field device belonging thereto.

* * * * *